United States Patent
Flecha

(10) Patent No.: US 8,196,335 B2
(45) Date of Patent: Jun. 12, 2012

(54) SPRING-LOADED FISHING LURE

(76) Inventor: Francisco Flecha, Chicago Heights, IL (US)

( * ) Notice: Subject to any disclaimer, the term of this patent is extended or adjusted under 35 U.S.C. 154(b) by 245 days.

(21) Appl. No.: 12/456,048

(22) Filed: Jun. 12, 2009

(65) Prior Publication Data

US 2011/0016767 A1    Jan. 27, 2011

(51) Int. Cl.
*A01K 97/12* (2006.01)
(52) U.S. Cl. .................................. 43/15; 43/16
(58) Field of Classification Search .................. 43/15, 16
See application file for complete search history.

(56) References Cited

U.S. PATENT DOCUMENTS

| | | | | |
|---|---|---|---|---|
| 283,444 | A * | 8/1883 | Wentworth | 43/15 |
| 751,734 | A * | 2/1904 | Hymers | 43/15 |
| 2,374,752 | A * | 5/1945 | Johnson | 43/15 |
| 2,726,470 | A * | 12/1955 | Bass et al. | 43/15 |
| 2,784,515 | A * | 3/1957 | McBride et al. | 43/15 |
| 2,808,673 | A * | 10/1957 | Coughlin | 43/15 |
| 5,123,196 | A * | 6/1992 | Pagano et al. | 43/37 |
| 6,493,981 | B2 * | 12/2002 | Izzard | 43/15 |
| 6,966,139 | B2 * | 11/2005 | Izzard | 43/15 |
| 7,849,629 | B1 * | 12/2010 | Adcock | 43/15 |

* cited by examiner

*Primary Examiner* — Christopher P Ellis
(74) *Attorney, Agent, or Firm* — Carla E. Buterman

(57) ABSTRACT

The present invention provides a simple, yet improved, spring-loaded fishing hook and bobber. The bobber includes a spring-loaded triggering apparatus attached to a light weight rod and floating device. The triggering apparatus is inertia-driven and activated when a fish swimming by attempts to bite on the lure. The fish activates the device by its movement away from the lure and pulls the spring free from its latch allowing the spring to activate and forces the hook into the fish's mouth. The quickness of the trigger does not allow the fish to avoid the hook and the forcefulness of the trigger means less fish can free themselves of the hook before being caught.

5 Claims, 1 Drawing Sheet

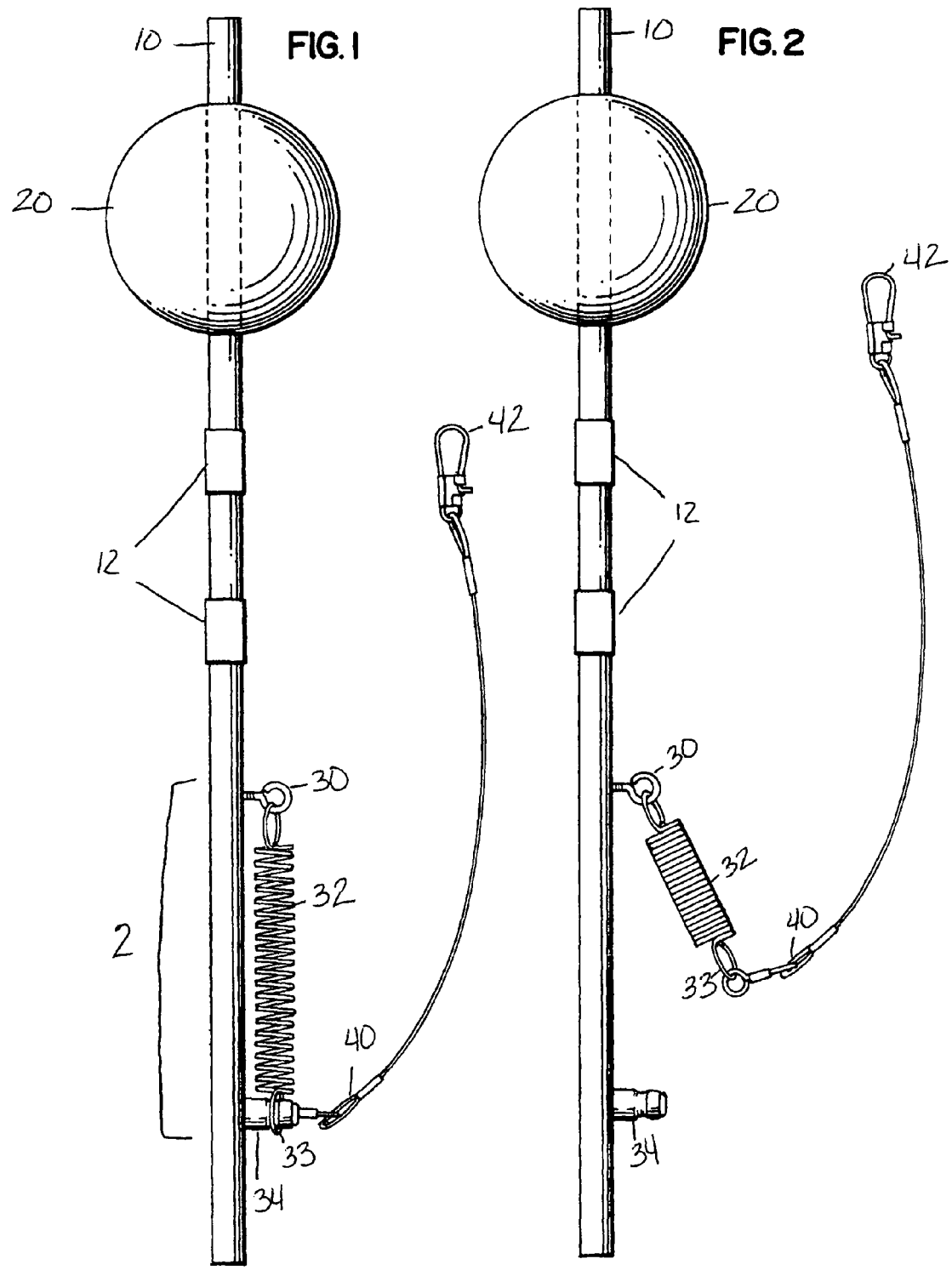

SPRING-LOADED FISHING LURE

BACKGROUND

This invention relates to a fishing apparatus consisting of a bobber and lure with a spring-loaded triggering device. It is well known to any fisherman that a good amount of fish is simply never caught because they avoid the fisherman's hook after stealing away with the bait. This device is designed to increase the chance that a fish is snared by the hook by using the fish's own movement of swimming to trigger the device.

The present invention employs a triggering device that forcefully sets a fish hook into a fish's mouth. Such devices are known in the art. See for example U.S. Pat. Nos. 4,446, 647, 5,050,332, 6,574,908 and 7,316,094. Current devices also have the formidable problem of having too many parts which can corrode due to the nature of the work or jam thereby rendering them useless for their intended purpose.

SUMMARY OF THE INVENTION

The present invention relates to a fishing bobber and hook device where the hook is a spring-loaded triggering device mounted on the side of a support that also houses the bobber. The stem or support is a light-weight material, typically hollow, that has a bobber at one end and the spring-loaded triggering device at the other. The spring-loaded triggering device consists of an eyelet fastened to the stem and a stopper fastened to the support with a screw. A spring is affixed to the eyelet and the coil of the spring is slide over the stopper so that it may be easily dislodged as the fish moves or pulls on the lure. Attached to the coil is the fishing lure that hangs at some distance below the apparatus as a whole.

It is the object of this invention to provide a structure that is easy to make, cost-effective to build and easily adjustable. The coil spring triggering device uses the inertia of the fish's own swimming movement to cause it to be activated, thereby thrusting the hook into the fish's mouth before it can spit the hook out. The present invention also allows its user to easily change the spring to suit to fit his/her needs. Thus, a stronger, larger coil could be used when fishing for larger fish, while a smaller spring coil could be used for smaller, more easily harmed fish.

The object of this invention is to provide a cost effective structure that mimics the results of more expensive, complex mechanisms as those described and known in the prior art.

BRIEF DESCRIPTION OF DRAWINGS

The present invention is disclosed with reference to the accompanying drawings:

FIG. 1 is a the front view of the fishing apparatus when engaged;

FIG. 2 is the front view of the fishing apparatus when activated.

DETAILED DESCRIPTION OF INVENTION

Referring to FIG. 1, there is shown the fishing apparatus of the present invention. The apparatus 1 includes a support 10, a floatation device such as a bobber 20, the spring-loaded triggering device 2 and a lure 42.

The support 10 can be made of any light-weight rigid material, such as wood, plastic, bamboo or metal and although the preferred embodiment of the support 10 is solid, the support may be hollow. At one end of the support 10 is a floatation device such a bobber that can be made of any material capable of floating and may be hollow or solid. The preferred embodiment of the support also has reflective material 12 wrapped around it that allows the support to be seen in darkness. At the other end of the support 10 is the spring-loaded triggering device 2.

The spring-loaded triggering device 2 consists of a fixed means 30 such as hook that attached to the support 10 by being screwed in to the support, a stopper means 34 that attaches the support and a spring 32 that stretched between the two means when engaged. The stopper means 34 can be indented so that the spring coil 33 is prevented from slipping off or smooth so that the spring coil 33 easily slips off the stopper means 34 so that it may be used to fish for small fish. A lure 42 is attached to the spring coil 33 and hangs as some distance below the spring-loaded triggering device 2.

Another embodiment of the spring-loaded triggering device 2 consists of a fixed means 30 and stopper means 34 can also be attached by being fastened to the support securely but without being screwed in so that they can be moved easily from one support and attached to another. In this embodiment, the spring 32 is fixedly and securely attached to the fixed means 30 and spring coil 33 is loosely slide over the stopper means 34.

Another embodiment of the fishing apparatus 1 consists of a support 10 that has multiple holes in it such that the spring-loaded triggering device 2 may have the tension of the spring 32 varied by inserting the stopper means 34 placed in the various holes. This would allow the user to vary the tension easily according to the type of fish being sought. This is in contrast to the embodiment above that would merely switch springs 32 to vary the tension in the spring 32.

The activated spring-loaded triggering device 2 can be seen in FIG. 2. Once a fish swimming by nibbles or bites on the lure 42 and attempts to swim away the spring coil 34 will be slide off of the stopper means 34 causing the spring 32 to constrict jerking the lure 2 into the fish's mouth.

This detailed description illustrates the preferred embodiment of the invention by way of example and not by limitation. It is understood by those skilled in the art that various changes and modifications may be made and equivalents may be substituted for elements thereof without departing from the scope of the invention and that it is intended that all matter contained in the above description and accompanying drawings shall be interpreted as illustrative and not limiting and will include all embodiments falling within the scope and spirit of the claims.

I claim:

1. A spring-loaded triggering fish hook device comprising:
    A support that consists of a light-weight shaft with a floatation device at one end and a spring-loaded triggering device at the other;
    A spring having a first upper end and a second lower end;
    Said spring securely attached to the support at the first end by a first attachment means and attached at the second end by a second attachment means, said second attachment means being indented;
    whereby a second end coil of the spring can be loosely secured so that it may easily be slid off by a fish biting a lure,
    said lure also being attached to the second end coil; whereby during operation, said spring dislodges from the second attachment means and recoils quickly.

2. The spring-loaded triggering device of claim 1, wherein the said spring is rubber coated.

3. The spring-loaded triggering device of claim 1, wherein the said spring is fabricated from stainless steel.

4. The spring-loaded triggering device as defined in claim 1, wherein said second attachment means is smooth so as to more easily allow the second end coil to be detached.

5. The fishing apparatus of claim 1, wherein the stem or support has multiple holes in the spring-loaded triggering device end so that the tension of the spring can be adjusted by placing the first attachment means in various holes.

* * * * *